United States Patent [19]
Broderick

[11] 3,757,679
[45] Sept. 11, 1973

[54] MOLD PROTECTOR

[76] Inventor: Walter M. Broderick, 854 Wilbraham Rd., Springfield, Mass. 01109

[22] Filed: Nov. 26, 1971

[21] Appl. No.: 202,116

[52] U.S. Cl............. 100/53, 425/DIG. 45, 425/154
[51] Int. Cl............................................ B30b 15/16
[58] Field of Search................... 100/53; 18/DIG. 45, 18/154

[56] References Cited
UNITED STATES PATENTS

| | | | |
|---|---|---|---|
| 2,801,442 | 8/1957 | Moslo | 425/DIG. 45 |
| 3,310,841 | 3/1967 | Hehl | 425/154 |
| 3,452,399 | 7/1969 | Blumer | 100/53 X |
| 3,568,553 | 3/1971 | Wanner et al. | 100/53 X |

FOREIGN PATENTS OR APPLICATIONS 976,518   11/1964   Great Britain............... 425/DIG. 45

*Primary Examiner*—Billy J. Wilhite
*Attorney*—Kenwood Ross et al.

[57] ABSTRACT

A safety mechanism for a molding machine in the form of a two-part pressure sensitive means, a first part being the movable platen and a second part being disposed forwardly thereof and supporting its mold with a gap of predetermined dimension being provided between the parts by means of friction free reeds supporting the second part relative to the first part so arranged that, in the event of a malfunction or in the presence of an obstruction, the pressure created on the mold creates a closing of the gap and triggers micro switches which are tied in with the machine opening and closing mechanism to quickly reverse the closing action of the molding machine.

1 Claim, 3 Drawing Figures

Patented Sept. 11, 1973

INVENTOR.
WALTER M. BRODERICK
BY Kenwood Ross &
Chester E. Flavin
ATTORNEYS.

MOLD PROTECTOR

The invention relates to protective arrangements or safety devices adapted for the protection of personnel and of the tools employed with molding machines or presses.

In molding machines or presses, the working elements are frequently made in at least two parts, one of which can slide in relation to the frame of the machine and come into confrontation with the other part along a closing plane in manner such as to form a sealed cavity (in the case of a molding machine) or a forming area (in the case of a press) so that the molding or pressing may be effected. When there is a foreign body in this closing plane, on the one hand the desired sealing is not realized so as deleteriously to effect the workpiece, and on the other hand there is a risk that the foreign body may seriously damage the machine.

The invention provides arrangements for avoiding these dangers and risks.

According to the invention, there is provided a protective arrangement in a machine in which parts are moved together to close the machine and limiting means comprising first contact means arranged to be actuated when, and only when, the mold parts are satisfactorily closed and second contact means arranged to be actuated when the closed mold has been displaced to a predetermined extent, said first and second contact means having contacts in an electrical circuit for controlling the following of an operational cycle arranged in such a manner that upon actuation of said second contact means, if said first contact means has not previously been actuated in the current operational cycle, said control circuit interrupts the movement of the mold and produces return movement of the mold.

The invention provides a safety device for a mold machine or a press which is operative to automatically withdraw one of the work-forming members of the machine from its normal operative position in the event that there is an obstruction in the path of relative movement of that member. In other words, if the operator inadvertently puts his hand between the work-forming members of the machine during an operating cycle, the safety device of this invention is designed automatically to reverse the closing direction of movement of the movable platen and its supported work-forming member so that the machine is motivated into machine opening direction so that the hand will not be injured.

Of course, the obstruction might be something other than the operator's hand and might simply be such as a projecting portion of an improperly positioned mold part.

Figure 1:
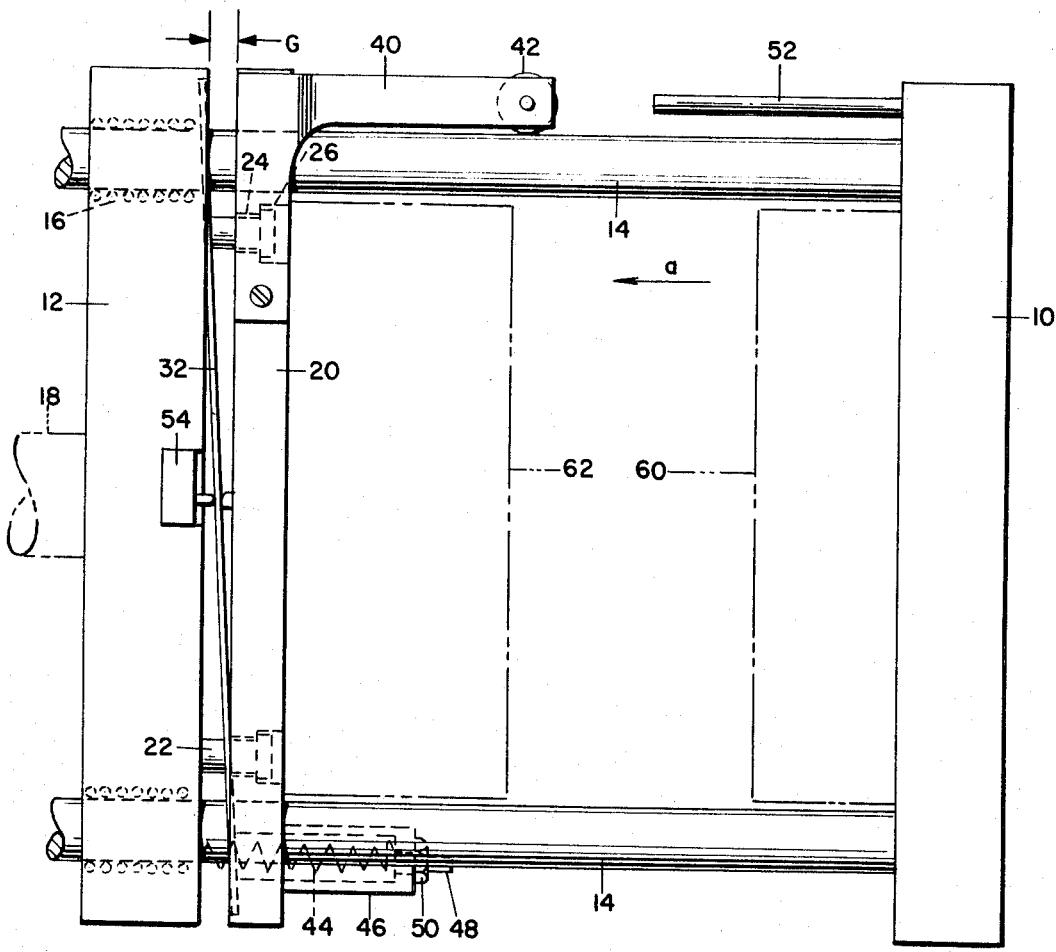
FIG. 1 is a view, in side elevation, of the apparatus of the invention in combination with other pprtinent parts of the mold or press.
Figure 2:
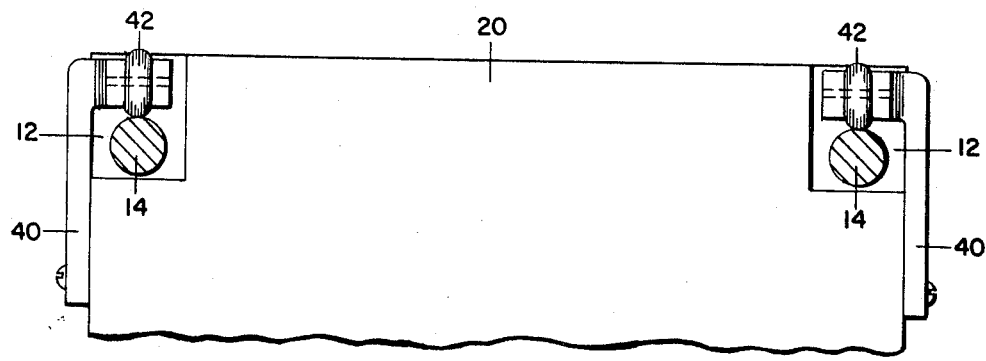
FIG. 2 is a fragmentary view, in front elevation, of the upper portion of the inboard pressure sensitive pad and related upper tie bars looking in the direction of the arrow a in FIG. 1 with the associated mold part removed.

The usual mold or press comprehends a stationary platen 10 and a movable platen 12 movable toward and away from the stationary platen along conventional sets of upper and lower tie bars 14 by virtue of such as ball sleeves 16 on opposite sides of the machine (not shown). The sliding of the movable platen is controlled by conventional means, for example, a hydraulically-operated ram 18.

Movable platen 12 will be understood to serve the function of supporting the so-called inboard pressure sensitive pad, as will appear.

An inboard pressure sensitive pad 20 is disposed adjacent the face of the movable platen 12 facing stationary platen 10 and is loosely secured to the movable platen as by shoulder screw retainers 22 fixed to the movable platen and extendable through enlarged bores 24 and seats 26 through the inboard pressure sensitive pad and adjustable so as to limit the dimension of the gap G between members 12 and 20 from exceeding a certain predetermined and adjustable dimension.

Figure 3:
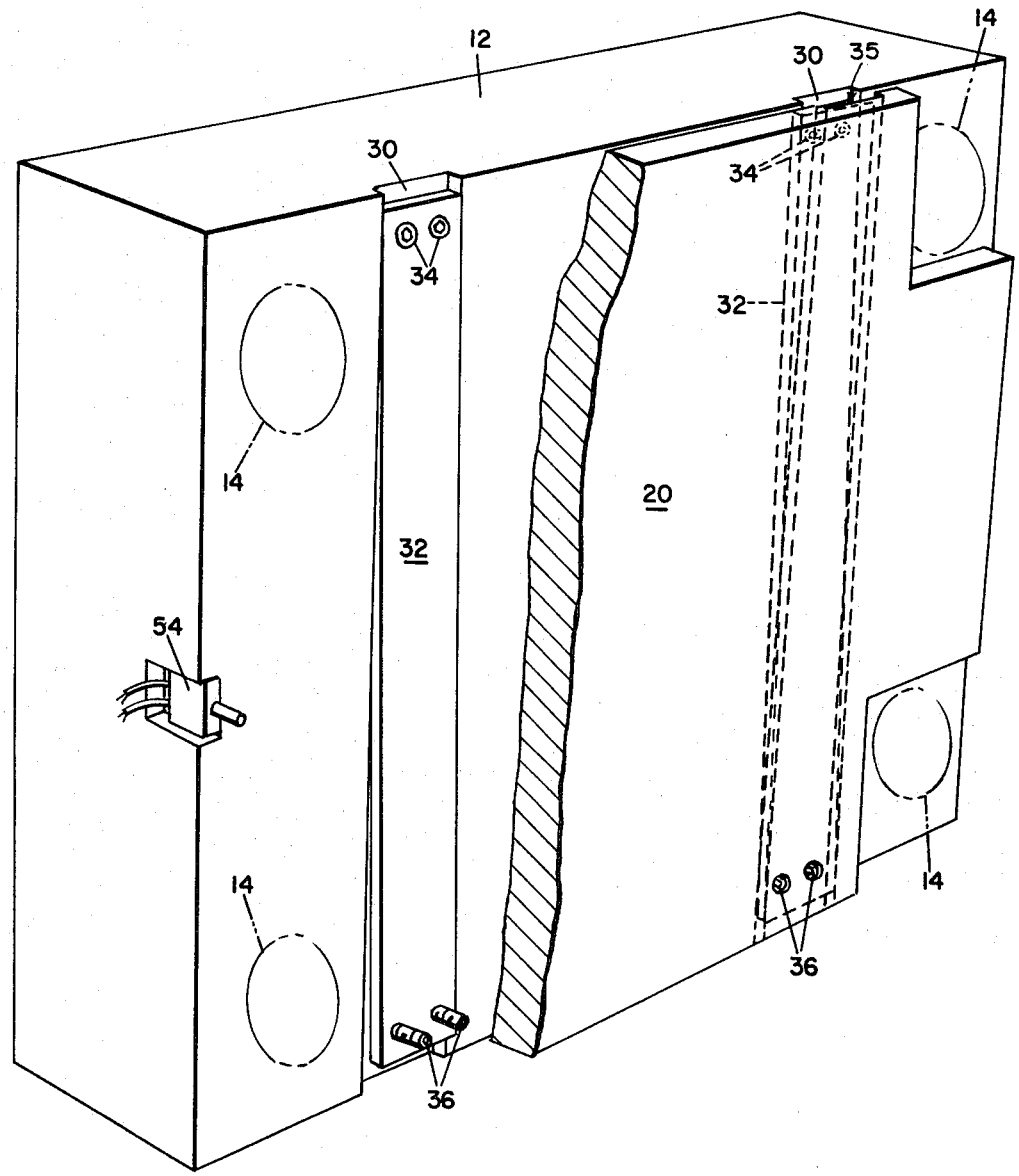
FIG. 3 is a fragmentary view, in perspective, of the apparatus shown in FIG. 1 with the support arms and rollers and tie bars removed.

The forward face of movable platen 12 is provided with a plurality of spaced vertical recesses 30, (see FIG. 3) extending from the top to the bottom thereof, in each of which recesses a reed or flat elongate spring 32 is receivable in a friction free manner and each being fixed at its upper extremity to the movable platen as by suitable bolting 34 and each being fixed at its lower extremity in a complimental recess 35 in the rearward face of inboard pressure sensitive pad 20 and secured thereto as by bolting 36.

Extending upwardly from the upper portion of each side edge of inboard pressure sensitive pad 20 is a support arm 40 suitably secured to the said pad as by bolting and configured so as to define an uppermost horizontally extending web portion which overlies the respective tie bar 14 in a direction toward the stationary platen and mounting a roller or oilite pad 42 at its free extremity, which roller or pad rides on the upper surface of the tie bar in manner such as to accept the load of the weight of the inboard pressure sensitive pad.

Thus, inboard pressure sensitive pad 20 is mounted on movable platen 12 by friction free reeds 32 and the weight of the said pad is carried by the support arms 40 bearing on their respective tie bars 14 through the means of the rollers 42.

On opposite sides of the machine, balance springs 44 seat against the movable platen, extend forwardly through suitable openings in inboard pressure sensitive pad 20, and seat at their opposite ends within a respective housing 46 secured to the forward face of said pad.

Adjusting means 48 extend through each housing and are held in adjusted position with respect to balance springs 44 by means of adjusting nuts 50.

By the adjustment of the balance springs, the inboard pressure sensitive pad and movable platen may be brought into equilibrium so that a small external force will compress the springs and signal "go" and "no go" conditions.

With a "go" condition, a provided first limit switch 52 or stationary platen 10 makes before a second limit switch 54 on movable platen 12 so as to indicate a safe condition wherefore the machine is in condition for lock up.

With a "no go" condition, second limit switch 54 makes before first limit switch 52 so as to indicate an unsafe condition and to effect a reversal of the operation of ram 18 into opening movement.

In the case of a molding machine, a mold part 60 is secured to stationary platen 10 by any conventional means and a mold part 62 is secured to inboard pressure sensitive pad 20 on movable platen 12.

By the construction described, the inboard pressure sensitive pad is seen to float relative to the movable platen so as to allow ready deflection upon encountering any obstruction or misalignment in the work area which deflection will cause the movable platen to change its movement from a closing movement to an opening movement.

I claim:

1. In a mold or press closing protective device of a molding machine having oppositely-facing fixed and movable platens and driving means for selectively motivating the movable platen toward and away from the fixed platen along sets of upper and lower tie bars, the improvement in a control circuit for precluding the closing of the fixed and movable platens when a foreign body is present between the platens by controlling the moving portions of the molding machine which are moving in mold-closing direction to actuate electromechanical reversing means and including:

a pressure-sensing plate floatingly-mounted relative to and forwardly of the confronting face of the movable platen, limit means for precluding the gap between the plate and movable platen from exceeding a predetermined dimension, the movable platen being provided with a plurality of recesses extending from the top to the bottom of the confronting face thereof, a plurality of yieldable elongated reeds each nestably received within a respective one of the recesses of the movable platen and fixedly mounted at one end to an adjacent portion of the movable platen and at an opposite end to an adjacent portion of the non-confronting face of the plate, support arms each secured to the plate and having a web portion mounting a roller for riding along a respective upper tie bar, and control means including micro-switches mounted on the movable and stationary platens, the switch on the movable platen being operative in response to movement of the pressure-sensing plate on encountering an obstruction between the platens for reversing the direction of movement of the movable platen.

* * * * *